Patented July 28, 1931

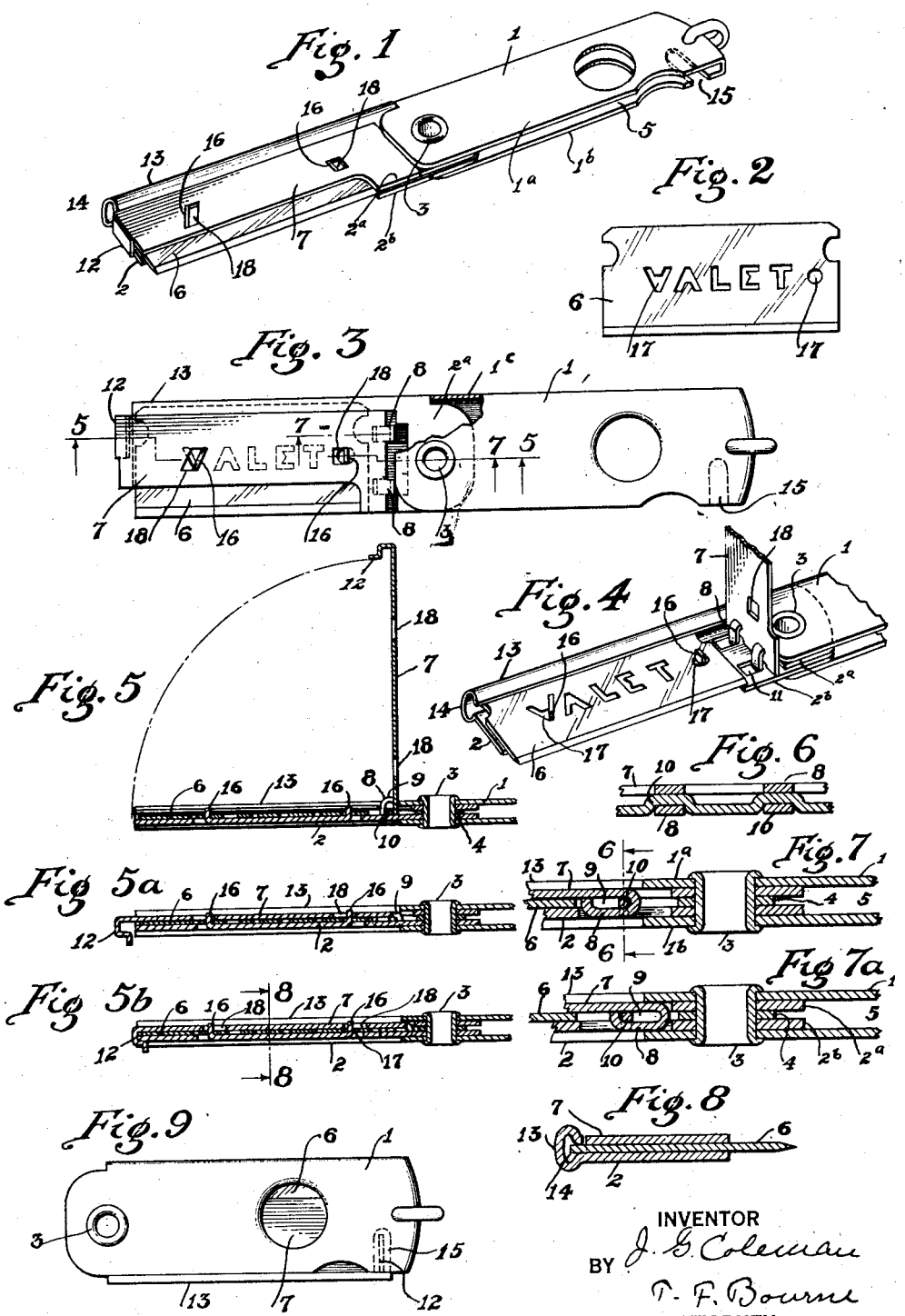

1,816,422

UNITED STATES PATENT OFFICE

JACQUES G. COLEMAN, OF WOODMERE, NEW YORK, ASSIGNOR, BY MESNE ASSIGNMENTS, TO GILLETTE SAFETY RAZOR COMPANY, OF BOSTON, MASSACHUSETTS, A CORPORATION OF DELAWARE

KNIFE

Application filed July 25, 1929. Serial No. 380,866.

My invention relates to improvements in knives having detachable blades.

An object of my invention is to provide simple and efficient means for detachably retaining a blade on a member movably attached to a handle so that said member with the blade may be folded within the handle for safety and extended therefrom for use.

My invention comprises novel details of improvement that will be more fully hereinafter set forth and then pointed out in the claim.

Reference is to be had to the accompanying drawings in which,

Fig. 1 is a perspective view of my improved knife in position for use;

Fig. 2 is a face view of a blade for the knife;

Fig. 3 is a partly broken view of the knife;

Fig. 4 is a detail perspective view of part of the knife;

Fig. 5 is a section on line 5, 5, in Fig. 3;

Figs. 5a and 5b are sections similar to Fig. 5, showing the parts in different positions;

Fig. 6 is a section on line 6, 6, in Fig. 7;

Fig. 7 is an enlarged section on line 7, 7, in Fig. 3;

Fig. 7a is a section similar to Fig. 7, showing the parts in different positions;

Fig. 8 is a section on line 8, 8, in Fig. 5b, and

Fig. 9 illustrates the knife in closed position.

Similar numerals of reference indicate corresponding parts in the several views.

The numeral 1 indicates the knife handle at one end of which a blade-carrying member 2 is pivoted at 3. A washer 4, at pivot 3, spaces the side walls 2a and 2b of the member 2 and the sides 1a and 1b of handle 1 to provide a space 5 to receive the member 2 and the blade when the knife is folded, (Fig. 9). The blade 6 is to be laid against the carrier member 2 and a blade retainer 7 is pivotally and slidably carried by the member 2, to overlie and retain the blade on said member, (Figs. 4 and 5). At the end adjacent to pivot 3 the retainer 7 has spaced hinge parts 8, provided with elongated spaces 9 to receive hinge members 10 on carrier member 2, (Figs. 6, 7 and 7a), whereby the retainer may be slid longitudinally and rotated relatively to the hinge members. The hinge members 10 may be made by cutting openings 11 in member 2 and pressing the metal thereof outwardly to off-set the hinge members, as shown in Fig. 6, whereby the retainer 7 will be slidably spaced from the member 2 to receive the blade 6 therebetween, (Fig. 7). The free end of retainer 7 is shown provided with a keeper 12 to engage the outer end of carrier member 2, to keep the parts 2, 6 and 7 in operative position for use as a knife, (Fig. 5b). The rear edge of carrier member 2 is shown coiled or bent over said carrier, at 13, providing a space at 14 to receive the heel of the blade, (Fig. 8), and the retainer 7 is slidable along said part 13. The side wall 1b of handle 1 is shown provided with a slot 15 to receive the keeper 12 when the knife is closed, (Fig. 9).

To retain the blade from movement between the carrier 2 and the retainer 7 the carrier is shown provided with projections 16, (which may be struck out from the metal of the carrier), adapted to pass through the openings 17 in the blade to engage the latter and keep the blade from sliding on carrier member 2 in use. The projections 16 are shown extending through the blade and the carrier 7 is shown provided with openings 18 adapted to register with the projections 16, when the carrier is closed against the blade, (Figs. 5 and 5a), the openings 18 being of sufficient width to permit the retainer 7 to be slid lengthwise while against the blade.

When the blade is to be fitted to the knife the parts are adjusted to the position shown in Figs. 4 and 5, and the blade is laid upon the carrier 2 with the projections 16 entering the openings 17 in the blade. The retainer 7 will next be closed upon the blade, as in Fig. 5a, and will then be slid longitudinally toward the handle to engage the keeper 12 with the carrier member 2, to retain the blade securely. When the blade is to be removed and replaced the operations described will be reversed. The blade will be securely retained for use, as in Fig. 1, and may be folded within the space 5 of the handle with the carrier and retainer, as in Fig. 9. The part 13 will engage the handle to keep the blade in proper position therein so that the edge of the blade will not engage the back wall 1c of the handle. The position of either of the projections 16 may be varied in different knives to prevent the use in a knife of an unauthorized blade having openings that might fit one carrier and not another.

Changes may be made in the details of construction set forth without departing from the spirit of the appended claim.

Having now described my invention what I claim is:

A knife comprising a handle having spaced sides, a blade carrier pivotally attached thereto to fold between said sides, said carrier having a portion along one edge extended over the carrier providing a space for the rear edge of the blade, a retainer for the blade pivotally attached at one end to the carrier to swing toward and from the same, said retainer being slidably supported by the carrier and having an edge slidable along said extended part of the carrier, the carrier having projections to enter openings in the blade and the retainer having openings for and larger than said projections, and means to detachably connect the outer end of the retainer with the carrier to keep the retainer over the blade, said edge portion of the carrier extending in position to engage the handle when the carrier is folded therein to keep the edge of the blade from engaging the handle.

Signed at New York, in the county of New York and State of New York this 19th day of July A. D. 1929.

JACQUES G. COLEMAN.